United States Patent [19]

Shapiro et al.

[11] 4,085,619
[45] Apr. 25, 1978

[54] ELECTRONIC BALANCER FOR VEHICLE WHEELS

[75] Inventors: Haskell Shapiro, Corona del Mar; Robert E. DeCaro, Tustin, both of Calif.

[73] Assignee: Royal Industries, Inc., Osseo, Minn.

[21] Appl. No.: 656,606

[22] Filed: Feb. 9, 1976

[51] Int. Cl.$^2$ ............................................. G01M 1/08
[52] U.S. Cl. ..................................................... 73/462
[58] Field of Search .......................... 73/462, 463–466, 73/459; 318/374

[56] References Cited

U.S. PATENT DOCUMENTS

| | | | |
|---|---|---|---|
| 2,886,756 | 5/1959 | Schaefer | 318/210 |
| 3,774,456 | 11/1973 | Crump | 73/462 |

*Primary Examiner*—James J. Gill
*Attorney, Agent, or Firm*—Warren A. Sturm

[57] ABSTRACT

This invention is directed to an off-the-vehicle type of wheel-tire balancer for vehicular wheels. A wheel and tire assembly which is to be balanced is disposed on a rotating shaft under the control of a signal responsive electronic control apparatus utilizing rotational velocity signals, rotational, directional, and positional signals and velocity of displacement of the mounting apparatus for the shaft to provide a suitably calibrated indicators, the amount of weight to be added at certain angular positions on the inner and outer planes of the wheel rim to provide a dynamic balance of the wheel-tire system. Further indicators are provided for relating the indicated weight to be added to an angular position of the wheel and tire system. The entire apparatus is automatic in operation in that once the system is started, a motor is energized to rapidly rotate the wheel-tire system up to a predetermined rotational velocity. Once this is attained, the magnitude and angular disposition of the weights to be disposed on the rims of the wheel-tire system is rapidly detected over but a few revolutions of the shaft and following this, the motor is energized in a reverse direction to provide a dynamic breaking force to rapdily bring the wheel-tire system to a rest position, the energization of the motor in the reversed direction being maintained until the shaft is actually reversed its direction of rotation for a predetermined angular displacement.

30 Claims, 13 Drawing Figures

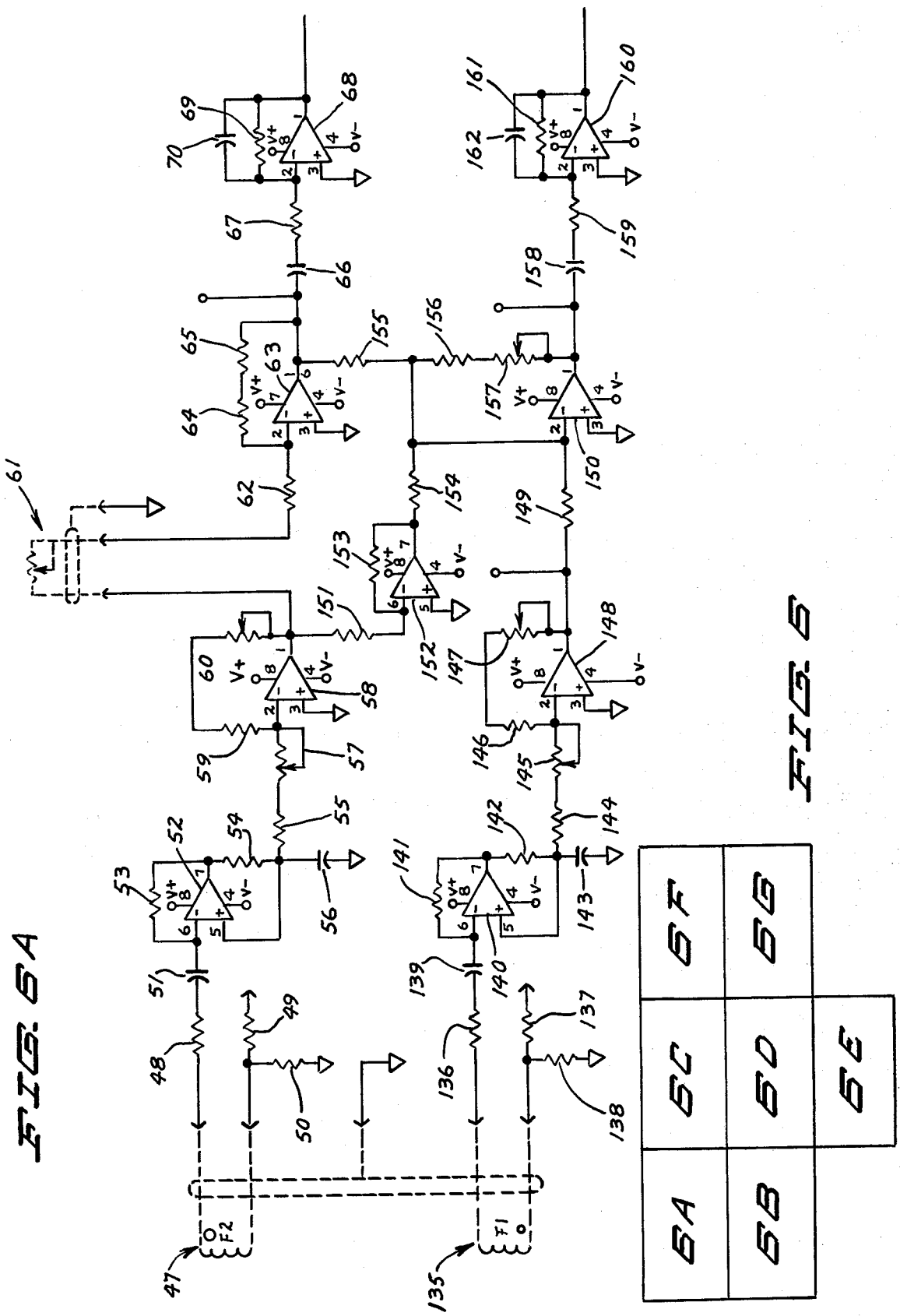

ELECTRONIC BALANCER FOR VEHICLE WHEELS

BACKGROUND OF THE INVENTION

The prior art with which this invention is concerned contains numerous examples of apparatus and concepts for balancing the wheel-tire systems of a vehicle so as to eliminate destructive and annoying vibrations present at various resonant frequencies of operation caused by static and dynamic imbalances in a wheel-tire system for each of the wheels of a vehicle.

For various reasons, including manufacturing inconsistencies, the majority of the wheel-tire systems on vehicles have imbalances which are not only annoying, but actually lead to premature failure of the tires and of the other components of the suspension systems for such vehicles.

It has been determined that one concept for determining the location and weight of materials to be added to a wheel-tire system should employ a dynamic measurement of the imbalance at one or more predetermined frequencies or rotational speeds of operation of the wheel-tire system. One of these have attempted to make the corrective determination while the wheel-tire system is in place on the suspension system of a vehicle thereby "tuning" the entire system. Such equipment has proven unsuitable under many conditions of operation and therefore, while such apparatus is available, it is the opinion of the inventors of the subject matter of this system that physically removing a wheel-tire system and providing a dynamic balance for each of the wheels of a vehicle provides uncomplicated, efficient and satisfactory dynamic balance of a wheel-tire system for each of the wheels of the vehicle.

SUMMARY OF THE INVENTION

The present invention facilitates that balancing of a wheel-tire system by providing an operation whereby the wheel-tire system is mounted upon a shaft that is in turn driven by a motor that is under the control of a system which accepts signals generated by the shaft and its mountings whereby a wheel-tire system is disposed on the shaft and a motor is energized to impart rotation to the shaft and wheel-tire system. Predetermined frequency or angular velocity of the shaft is selected in accordance with the intended operational characteristics of the vehicle upon which the wheel-tire systems are to be used. Sources of signal corresponding to the rotational velocity or speed of the shaft and the angular position of the shaft, resolved to a predetermined angular degree, are utilized to first detect the coincidence of actual speed with predetermined speed for the shaft at which time both of the signals corresponding to speed and angular position are utilized to process the information derived from two or more sources of signal that are responsive to the velocity of displacement of the shaft in a plane. The processing of the information contained in the signals continues for a short predetermined time after which, the motor is energized in such a manner to cause reverse operation and this form of dynamic braking of the motor, which takes place over a very short period of time, brings the wheel-tire system to a rapid stop position, such position being related to the reverse direction of the shaft for a predetermined, short angular motion. The magnitudes of the weights relating to the imbalance of the wheel-tire system may conveniently be displayed on meters calibrated in ounces or grams or other suitable systems of weight measure. In addition to the magnitudes, there are provided further signal responsive means which will energize an indicator such as a lamp, whereby when the wheel-tire system is rotated on the shaft, an angular position for each of the magnitudes of corrective weights will be indicated by illumination of the lamp or other indicator, the angular position being related to the magnitudes and each being related to one of the planes of the wheel that is adjacent the rims, such planes lying in perpendicular disposition with respect to the axis of rotation of the shaft upon which the wheel-tire system is mounted.

It is therefore an object of our invention to provide an accurate and efficient off-the-vehicle wheel and tire system balancing apparatus. Other objects and advantages of our invention will become apparent from a consideration of the appended specification, claims, and drawings in which:

FIG. 1 is a schematic and diagrammatic representation of an operational system embodying the principles of our invention;

Figure 3:
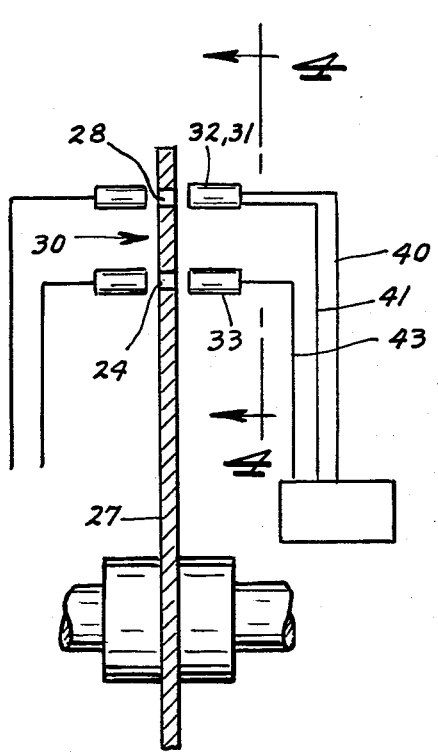
Figure 2:
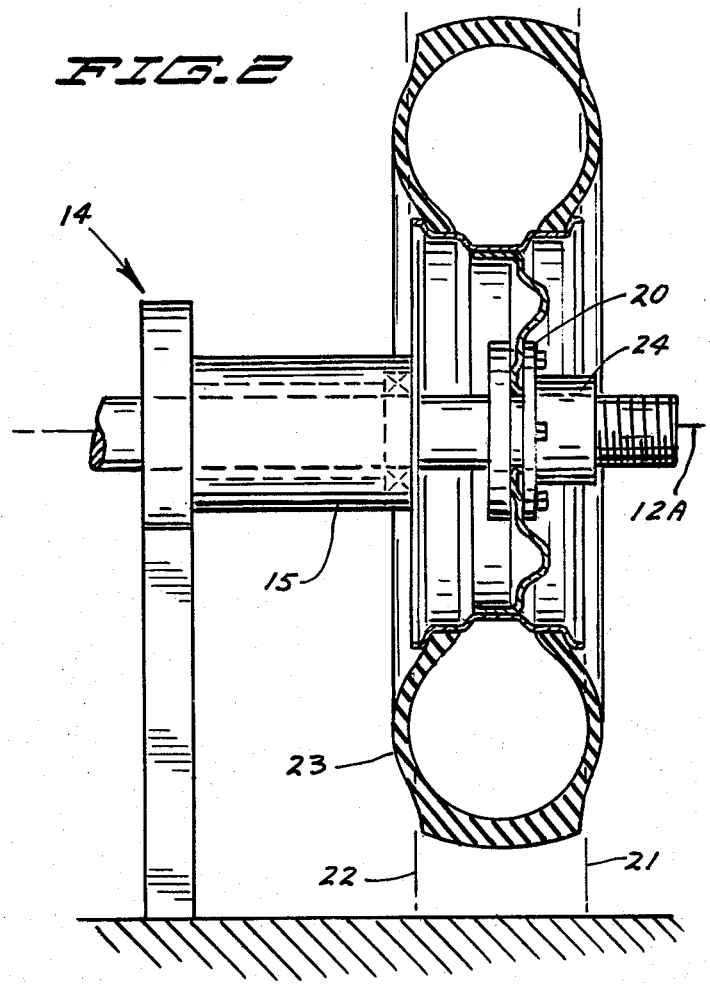
Figure 4:
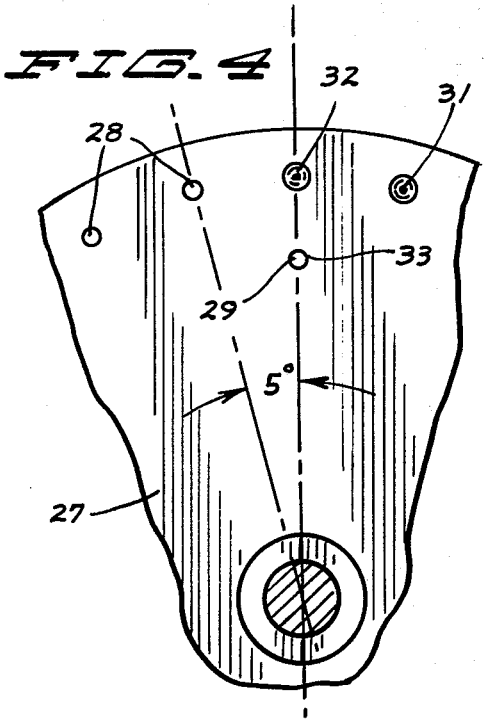
Figure 5:
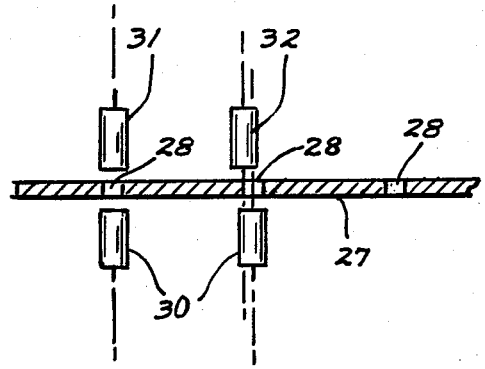
Figure 6B:
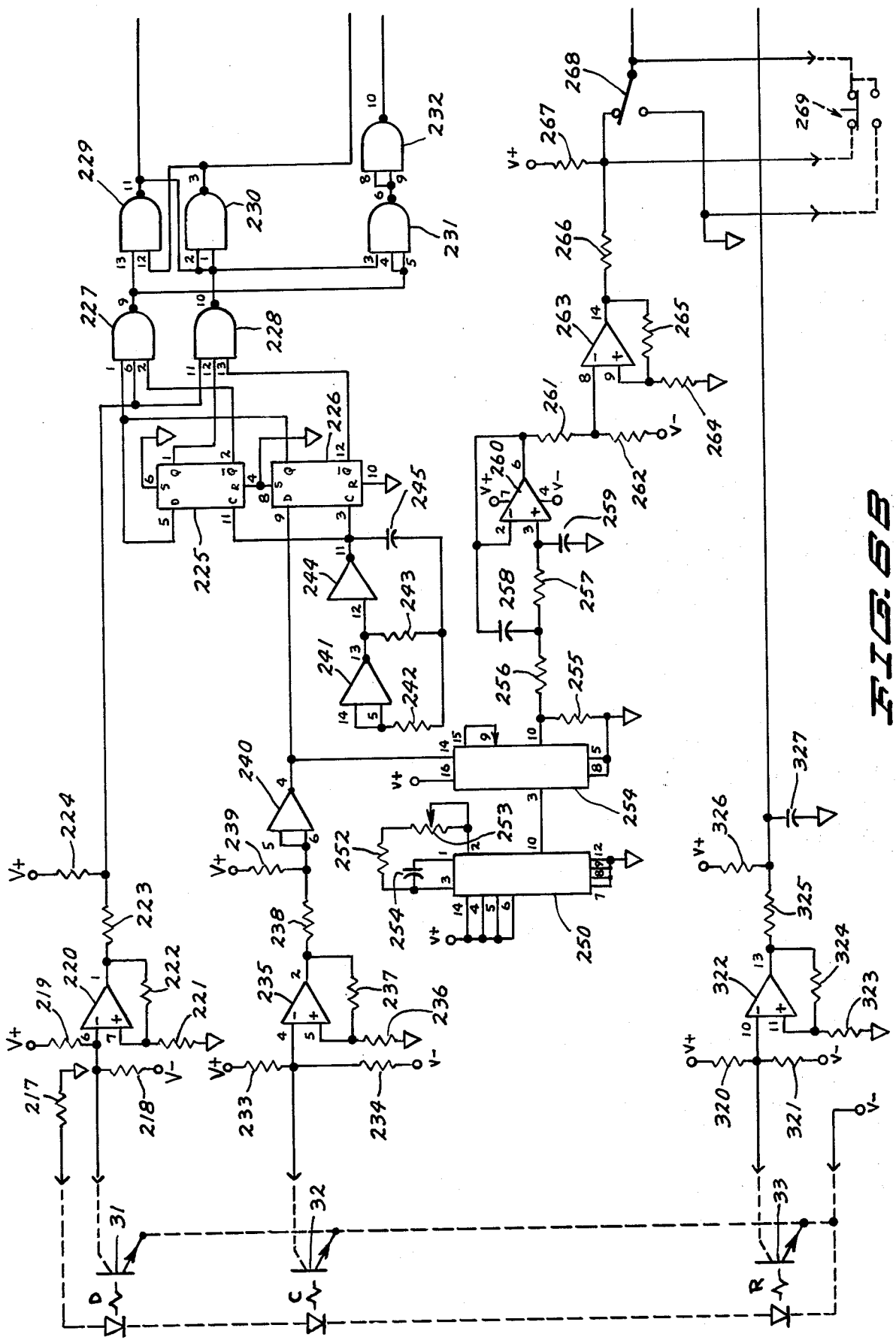

FIGS. 3, 4 and 5 are detailed views showing the relationship of the elements disposed on the left end of FIG. 1 of the drawings; and FIGS. 6-6G comprise an electrical schematic diagram incorporating the principles of my invention into a signal processing and motor control system as embodied on FIG. 1 of the drawings, specifically, FIG. 6 illustrates the manner in which FIGS. 6A-6G may be assembled to form a complete electrical and diagrammatic showing of our invention.

DETAILED DESCRIPTION OF THE DRAWINGS

Referring to FIG. 1 of the drawings, a diagrammatic representation of a complete balancing machine is indicated generally by reference character 10. The apparatus includes a rotatable shaft 12 having an axis of rotation 12A. A pulley 17 is nonrotatably disposed on shaft 12 and is driven by motor 11 having an output pulley 18 through drive belt 19. Shaft 12 is rotatably journaled in bearings 13 and 14, such bearing being mounted upon a suitable base whereby forces that may be exerted thereon due to an imbalance in a wheel-tire system 20-23, are constrained and do in fact occur substantially within a plane, as indicated by reference character 16. The velocity of the back and forth movement of bearings 13 and 14 within plane 16 may be sensed by suitable velocity detecting transducers 25 and 26 which serve to convert any displacement of bearings 13 and 14, along the directions indicated adjacent them into electrical signals that are representative of such velocity of displacement. A wheel-tire assembly is shown disposed on the right end of shaft 12 by suitable screw threaded means that may be attached to the mounting holes on wheel 20, such mounting is indicated by reference character 24, and as will be discussed below, mounting member 24 is adjustable longitudinally of shaft 12 to provide positioning of one of the planes of rotation of wheel-tire system 20-23 in the plane of rotation of one of the effective portions of one of the bearing members. A position and speed signal generator, indicated by reference character 27, includes a plurality of apertures 28 disposed on a common radius and at intervals sufficiently small to provide the required angular resolution of a shaft position during the balancing operations. A further single aperture 29 is shown disposed on a different radius and, as will be explained in more detail below, serves to provide a signal proportional to the rotational velocity of shaft 12. Suitable sources of light, disposed in predetermined relationship with apertures 28 and 29 in signal generating member 27, are provided to illuminate a plurality of light sensitive sources of signal indicated by reference characters 31, 32, and 33. Each of these is shown connected through suitable conductors 40, 41, and 42, respectively, to a signal processor and motor control, block. Similarly, motor 11 is connected to the same block through conductor 45 as are the outputs of velocity of displacement sensors 25 and 26 through conductors 43 and 44, respectively. A pair of indicating lamps 36 and 37, further identified by $\phi I$ and $\phi O$, and a pair of indicating meters 34 and 35 are likewise indicated by WO and WI.

In operation, briefly, a wheel-tire system is suitably disposed on mounting clamp 24 and the assembly is locked in place with the plane of rotation of the inner rim of wheel 20 in the plane of rotation of the effective bearing portion of bearing 14 (as seen on the left end of portion 15 of bearing 14). Signal processor and motor control may be operable to initiate operation of the system of energizing motor 11 to drive shaft 12 in a predetermined direction. As shaft 12 reaches a predetermined rotational velocity, signal processor and motor control block becomes operative to accept the velocity of displacement signals from sensors 25 and 26 and the velocity and position of rotation as determined through the use of sensors 31, 32 and 33, to make a rapid determination of the amount of weight that is necessary to correct the imbalance of the wheel-tire system and the angular positions that the weights should be added to the wheel-tire system, after which motor 11 is de-energized and then re-energized in a reverse direction to rapidly effect a dynamic breaking of shaft 12 and, upon detection of the reverse revolution of shaft 12 over the predetermined degrees of angular resolution, it would de-energize motor 11 and allow the shaft to remain at rest. At this time, meters 35 and 34 indicate the amount of weight to be added to the wheel and tire systems on the inner plane 22 and outer plane 21. Indicators 37 and 36 are energized at this time. In order to complete the balancing operation, the operator manually rotates the wheel-tire system and at the position that the weight is required as indicated on meters 35 and 34, one or the other of indicators 37 and 36 will be energized to indicate to the operator that the correct angular position for adding the weight has been reached. Conveniently, one might use a vertical axis through generally horizontal plane 16 as a reference so that the operator will know where to attach the indicated corrective weight to each of the planes of the wheel-tire system. In other words, there need be no angular scale or other forms of indicia required, the location at which the weight is applied with respect to plane 16 remains constant while the wheel is rotated on shaft 12 and when the appropriate angular position is obtained, the appropriate indicator light will alert the operator that a weight should be attached at that particular angular position of wheel 20.

Figure 2:
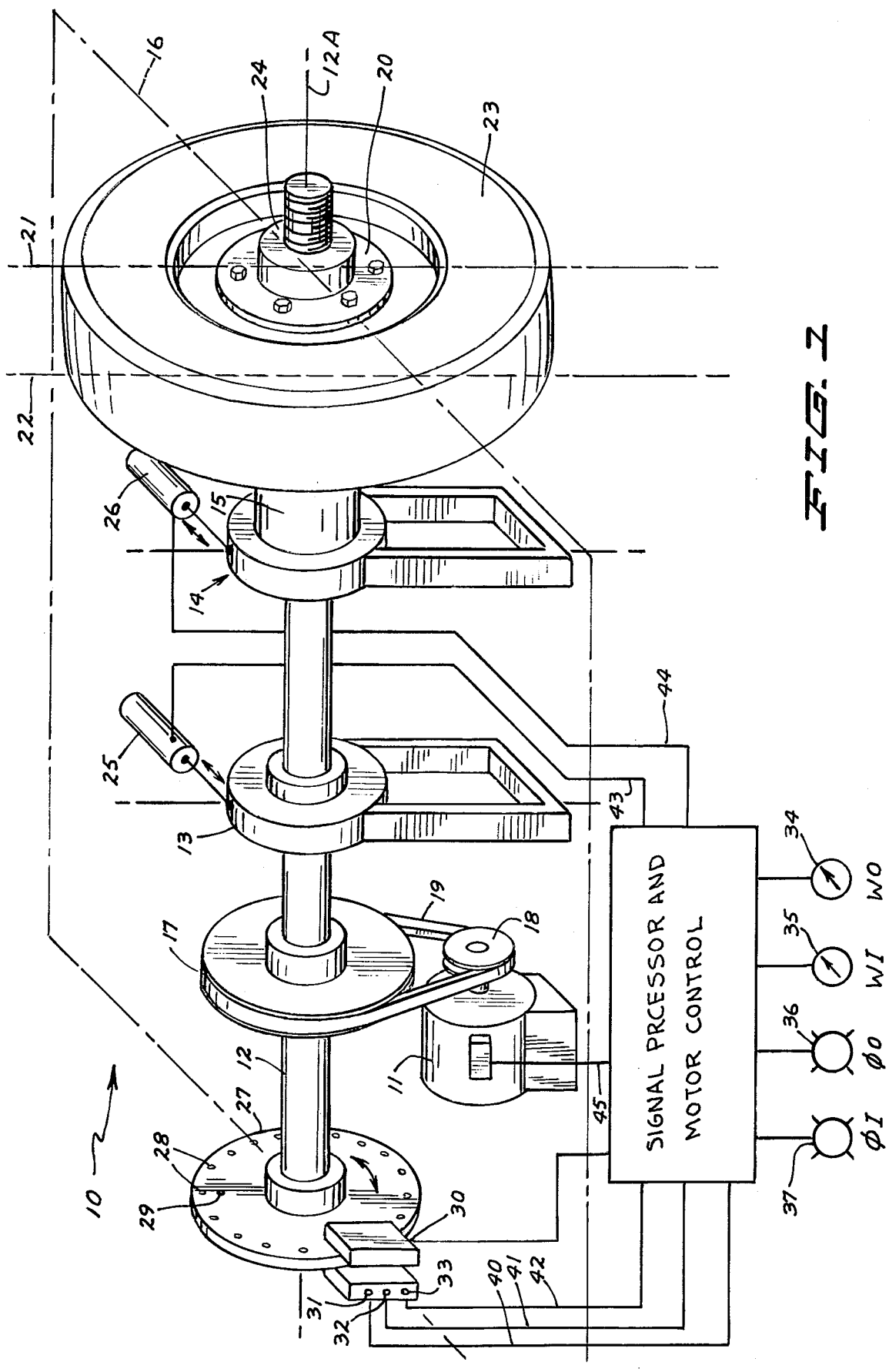
FIG. 2 is a side elevational view, partly in section, of a portion of the right end of FIG. 1 showing the relationship between a bearing and a wheel mounted on the shaft.

Referring to FIG. 2 of the drawings, it may be seen that bearing 14 includes a hollow tubular portion extending rightwardly along shaft 12 and that the actual bearing surface is disposed at or about the end of tubular portion 15. This places the actual bearing support in substantial registration with the plane of the rim of wheel 20 as indicated by reference line 22. This is also known as the inner edge of the wheel-tire system and is one plane of reference which, together with the plane represented by reference line 21, the outer plane (extending substantially within the plane of the right or outer rim of wheel 20) form two reference planes or surfaces in which weights may be deposited at appropriate angular positions to compensate for any imbalance in the wheel-tire system.

Before proceeding into a detailed description of the electrical schematic and diagrammatic portion of this invention, reference is made to FIGS. 3, 4 and 5 which are concerned with illustrating some details of the velocity and positioning portions of our invention. Disk 27 is shown having apertures 28 on a common radius. For the purposes of the present disclosure, apertures 28 are disposed in 64 spaced apart locations whereby the angular distance between each of the apertures is 5 degrees, the resolution deemed desirable for establishing the radial position of an imbalance force and the position of the location on the object to be balanced for adding suitable material to compensate for the imbalance. A further aperture 29 is disposed radially inwardly and is a single aperture. Referring to FIG. 3, it may be seen that radiation source 30 may be comprised of individual elements, for example, light emitting diodes that are appropriately positioned as in FIG. 3 and FIG. 4, the array may be considered to be, collectively, as shown on FIG. 1, as a source of radiation 30. The sensors, which may take the form of photoelectric transistors 31, 32 and 33, are disposed to coact with the apertures in disk 27 such that detector 33 is energized or illuminated once during each complete revolution of disk 27. Sensors 31 and 32 are spaced apart such that one of them may be on the center line of an aperture and the other one will have its center line at approximately one or the other edges of an aperture, as shown in FIG. 5. This provides for signals from detectors 31 and 32 which, when properly processed, not only provide an angular position signal, but which may, and as described below, provide a direction of rotation signal which is utilized to properly process the angular positional information as well as to control the operation of motor 11. While it may, in some circumstances, be desirable to obtain rotational velocity information from sensors 31 and 32, a separate sensor 33 is utilized in combination with the electronic and electrical computing aspects of our invention under circumstances which, it has been discovered, a single informational signal is useful to indicate the rotational velocity of shaft 12.

Referring to composite FIG. 6–6G, it may be seen at the right-hand portions of FIGS. 6A and 6B that the signals referred to above are presented at the inputs to the electrical and electronic portions of the balancing apparatus. On FIG. 6A, windings 47 and 135, also indicated by reference characters F2 and F1, represent the output windings of the planar motion velocity detectors 25 and 26, respectively. These sources of signals are also related to inner and outer planes 22 and 21 and the signal appearing at winding 47 is related related to the outer plane, while the signals appearing at 47 and 135 is related to the inner plane. At the left end of FIG. 6B, three light emitting diodes are shown in phantom form as suitably energized from a source of potential in the circuit which includes resistor 217. Detectors 31, 32, and 33 are shown in the form of photoelectric transistors having their emitters connected in common to a source of potential and their collector electrodes each connected to amplifiers 220, 235 and 322, respectively. At the right-hand end of FIGS. 6F and 6G, inner and outer meters 35 and 34 are shown in phantom connection to the outputs of amplifiers 206 and 121, respectively, and to a common signal ground. At the right end of FIG. 6G, inner and outer indicator lamps 37 and 36 are shown connected to the outputs of transistors 305 and 312, respectively, and, through a phantom connection, to a source of potential. Further outputs are indicated as the motor contactor windings of motor 11, windings 354 and 365, representing forward and reverse operation of motor 11. Winding 354 is shown connected to the output of transistor 358 and winding 365 is shown connected to the output of transistor 364.

Referring to FIGS. 6A, C and F, it may be recognized that there are essentially two channels for signal processing of the signals indicative of the velocity of displacement of bearings 13 and 14 as sensed by velocity detectors 25 and 26. The top or upper channel is as follows; winding 47 has its lower end connected to a signal ground through resistor 50 and its upper end connected to input terminal on amplifier 52 through resistor 48 and capacitor 51. A resistor 53 interconnects the input and output terminals on amplifier 52 and a further resistor 54 connects the output terminal to another input terminal. The lower end of resistor 54 is connected to ground through capacitor 56 and to an input terminal on amplifier 58 through resistor 55 and potentiometer 57. Another input terminal on amplifier 58 is connected to ground and the output terminal is connected to the other input terminal through potentiometer 60 and resistor 59. The output terminal of amplifier 58 is connected to the input terminal on amplifier 63 through potentiometer 61 and resistor 62. The output terminal on amplifier 63 is connected to the same input terminal through resistors 65 and 64 and the other input terminal is shown connected to ground.

The output terminal on amplifier 63 is connected to an input terminal on amplifier 68 through capacitor 66 and resistor 67. The same input terminal is connected to the output terminal on amplifier 68 through capacitor 70 and resistor 69, connected in parallel and the other input terminal is connected to ground. The output terminal on amplifier 68 is connected to an input terminal on amplifier 74 through potentiometer 71 and resistor 73. The output terminal is connected to the same input terminal through the parallel combination of capacitor 75 and resistor 76. The other input terminal is connected to ground. The output terminal on amplifier 74 is connected to an input terminal on amplifier 79 through capacitor 77 and resistor 78. A further resistor 80 connects the output terminal with the same input terminal and the other input terminal is shown connected to ground through resistor 81. The output of amplifier 79 is connected to a full-wave demodulator which includes amplifiers 85 and 94. The output of amplifier 79 is connected to the input of amplifier 85 through capacitor 82 and resistor 84. The input terminal is also connected to the output terminal on amplifier 85 through diode 88, resistor 90 and diode 87. The other input terminal on amplifier 85 is connected to ground and intermediate contacts 1 and 4 are interconnected through capacitor 86. The junction of capacitor 82 and resistor 84 is connected to an input terminal on amplifier 94 through resistor 92. The same input terminal is also connected to the output terminal through resistor 97. Further, the input terminal is connected to the junction between resistor 90 and diode 87 through resistor 93. The other input terminal is connected to ground through resistor 95 and terminals 4 and 8 are interconnected by capacitor 96. The demodulated signal appearing at the output terminal of amplifier 94 is connected to a filtering network comprised of resistors 99 and 101 to an input terminal on amplifier 102, the input terminal is also connected to ground through capacitor 103. The other input terminal on amplifier 102 is connected to its output terminal and to the junction between resistors 99 and 101 through capacitor 100. The output terminal on amplifier 102, a well-filtered dc potential can be applied to an input terminal on amplifier 121 through analogue switch 104 and conductor 105 for purposes of calibration. The output terminal on amplifier 102 is also connected to an input terminal on amplifier 108 which functions as a voltage comparator.

The output of voltage comparator 108 is connected to an input terminal on flip-flop 113 through resistor 111 and resistor 112. The output of voltage comparator 108 is also connected to another input terminal through resistor 104. The output terminal on flip-flop 113 is connected to the enable terminal on the left hand section of binary counter 118 to enable it to receive clock pulses through its No. 1 terminal from the output of gate 232. The output terminals on binary counter 118 are connected to the input terminals on a resistor network 119 which converts the binary signals into an analog potential. The output terminals are also connected to nand gate 117 which is in turn connected to the reset terminal on flip-flop 113 through inverter 116 and diode 114. The output terminal on resistor network 119 is connected to amplifier 121 and to ground through resistor 120. A further input terminal is connected to the output terminal of amplifier 121. The output terminal of amplifier 121 is connected to meter 34 through resistor 123 and to ground through diode 122. The output terminal is further connected to an input terminal on amplifier 128 through resistor 124. The same input terminal is connected to the output terminal of amplifier 128 through resistor 129 and to a source of potential through resistors 127 and 125 and to ground through resistor 127 and diode 126. The output of amplifier 128 is connected to the input of amplifier 131 through resistor 130. The same input terminal is connected to the output terminal of amplifier 131 through capacitor 132 having a resistor 133 in parallel therewith. The other input terminal is connected to ground. The output terminal of amplifier 131 is connected to the lower input terminal on amplifier 108 through resistor.

Similarly, the output winding 135 on velocity transducer 26 is connected to inner meter 35 through amplifier 140, amplifier 148, amplifier 150, amplifier 160, potentiometer 72, amplifier 164, amplifier 167, demodulator 173 and 181, amplifier 189, voltage comparator 374, flip-flop 380, digital counter 203-204, resistor network 205 and amplifier 206. The output of amplifier 206 is connected to voltage comparator 374 through amplifiers 211 and 214, and the output of digital counter 203-204 is connected to the reset terminal on flip-flop 380 through nand gate 202 and amplifier 201. It may also be noted that the output of the resistor network 119 is connected to the output terminal of amplifier 102 through conductor 105 and flip-flop 104. Similarly, the output of resistor network 205 is connected to the output terminal of amplifier 189 through flip-flop 191.

Referring specifically to FIG. 6A, it may be noted that an interconnection between the two signal processing paths shows the output of amplifier 58 connected to the input of amplifier 150 through resistor 151, amplifier 152 and resistor 154. The output terminal of amplifier 152 is also shown connected to the input terminal that is connected to resistor 151. The other input terminal is connected to ground. There is also a connection existing between the output of amplifier 63 and the output of amplifier 150 through resistor 155, resistor 156 and potentiometer 157.

Referring now to FIGS. 6B, 6D, 6E and 6G, the left hand end of FIG. 6B represents the signals received from disk 27 and its adjacently disposed sources of illumination 30 and radiation responsive signal generating elements shown in the form of transistors 31, 32 and 33. The light emitting diodes D, C and R are energized from the power supply (not shown) from the negative terminal through the diodes to a ground terminal through resistor 217. The output of transistor 31 is connected to an input terminal on amplifier 220. The input terminal is connected intermediate positive and negative terminals on the power supply (not shown) through resistors 214 and 218. The other input terminal on amplifier 220 is connected to its output terminal through resistor 222 and to ground through resistor 221. The output of amplifier 220 is connected to input terminals on nand gates 227 and 228 through resistor 223. The output terminal on amplifier 220 is also connected to the voltage source through resistor 224.

The output of transistor 32 is connected to an input terminal on amplifier 235 which is in turn connected to positive and negative sources of voltage (not shown) through resistors 233 and 234, respectively. The output terminal of amplifier 235 is connected to another input terminal through resistor 237 and to ground through resistor 236. The outputof amplifier 235 is connected to inverter 240 through resistor 238 and to a source of voltage through resistor 239. The output of inverter 240 is connected to an input terminal flip-flop 226 and to the input of phase lock loop 254. Flip-flop 226 also has a clock terminal connected to an oscillator comprised of amplifiers 241 and 244. The input terminals of amplifier 241 are connected to its output terminal and the output terminal of amplifier 244 through resistor 242 and resistor 243 and capacitor 245, respectively. The output terminal on amplifier 241 is connected to an input terminal on amplifier 244, the output terminal of which is connected to the clock terminal indicated by 3 on flip-flop 226, and to the clock terminal indicated by 11 on flip-flop 225. The $\overline{Q}$ terminal on flip-flop 226 is connected to an input terminal on nand gate 228. The $\overline{Q}$ terminal on flip-flop 226 is connected to the D or drive terminal on flip-flop 225. The $\overline{Q}$ terminal on flip-flop 225 is connected to an input terminal on nand gate 227 and the $\overline{Q}$ terminal on flip-flop 225 is connected to an input terminal on nand gate 228. It should be noted that the oscillator connected to the clock terminals on flip-flop 225 operates at a substantially higher, in the order of ten times or more higher, frequency than the signals which are generated by disk 27 through its apertures 28 to transistors 31 and 32. The output of nand gate 227 is connected to input terminals on nand gates 229 and 231 and the output of nand gate 228 is connected to input terminal on nand gate 230 and an input terminal on nand gate 231. The output of nand gate 229 is connected to an input terminals on nand gate 230 and nand gate 231. The output of nand gate 230 is connected to an input terminal on nand gate 229 and to the up-down direction terminals 10 on up-down counters 273 and 272. The output of nand gate 231 is connected to count terminals 15 on binary counters 273 and 272, respectively, through nand gate 232, and to the clock terminals 1 on binary counters 118 and 203. The outputs Q4, Q3, Q2 and Q1 on up-down counter 272 are connected to inputs D4, D3, D2 and D1 on hex latches 277 and 278. Output terminals Q6 and Q5 on up-down counter 273 are connected to input terminals on exclusive or gates 275 and 274, respectively, and further to input terminals on the indicated exclusive or gates connected to the output of hex latches 277 and 278. The output of exclusive or gate 275 is connected to input terminals D4 on hex latches 277 and 278 and to an input terminal on exclusive or gate 274. The output of exclusive or gate 274 is connected to an input of exclusive or gate 276 and to terminals D6 on hex latches 277 and 278. It should also be noted that the output terminals of hex latches 277 and 278 are connected to input terminals of certain ones of the exclusive or gates appearing adjacent the right sides of hex latches 277 and 278 with the connections performed as indicated. The outputs of the exclusive or gates are connected to a pair of nor gates and thence to nand gates 280 and 279, respectively. The output of nor gate 280 is connected to an input terminal of a nand gate 289, the output of which is connected to inner indicator lamp 37 through resistor 300 having diode 301 in parallel therewith, the input terminal of amplifier 306, such input terminal also being connected to ground through capacitor 302, resistor 303 and transistor 305 through indicator 37 to a source of negative potential (not shown). The output of nand gate 279 is connected to an input terminal of nor gate 290, the output of which is connected to outer indicator 36 through resistor 308 having diode 307 in parallel therewith, the input terminal of amplifier 309, such input terminal being connected to ground through capacitor 310, resistor 311 and transistor 312.

The count terminal 9 on hex latches 277 and 228 is controlled from flip-flops 287 and 335, respectively. These are in turn controlled from a signal derived from the zero crossing of the velocity signal appearing in the inner and outer channels which correspond to the positional information that is to be processed for the inner and outer channels. Flip-flop 287 is connected to the inner channel at the output of amplifier 167 through conductor 170 connected to an input terminal of amplifier 256, the output of which is connected to the C terminal of flip-flop 287 through resistor 284. The C terminal is also shown connected to a source of voltage through resistor 275. The output of amplifier 256 is connected to an input terminal through resistor 283 and to ground through resistor 282.

Similarly, flip-flop 335 is connected to the output of amplifier 79 through conductor 83, resistor 330 connected to an input terminal on amplifier 229 and resistor 333. The C terminal on flip-flop 335 is also connected to a source of potential through resistor 334 and the output terminal on amplifier 229 is connected to an input terminal through resistor 332 and to ground through resistor 331.

Referring to the center middle portion of FIG. 6B, an oscillator comprised of a multivibrator 250 is shown having resistors 252 and 253 intermediate its terminals 2 and 3 and a capacitor, 254, connected between terminals 1 and 3 and other terminals connected to either a source of voltage or to ground. The output is applied to a phase locked loop which is shown having its output connected to ground through resistor 255 and to amplifier 260 through resistor 256 and 257. That the input terminal on amplifier 260 is also connected to ground through capacitor 259. The junction between resistors 256 and 257 is connected to a further input terminal on amplifier 260 through a capacitor 258 and that input terminal and output terminal are shown interconnected. The output of amplifier 260 is connected to the input of amplifier 263 through resistor 261 and to a source of negative potential through resistor 262. The other output terminal of amplifier 263 is shown connected to ground through resistor 264 and to its output terminal through resistor 265. A further resistor 266 is shown connecting the output of amplifier 263 to one of the terminals on single pole double throw switch 268. The same terminal on switch 268 is also connected to a source of positive potential through resistor 267. In the run position of switch 268, the output of amplifier 263 is applied to input terminal $C_A$ of binary counter 270.

At the bottom of FIG. 6B of the drawings, transistor 33 is shown having its output connected to an input terminal on amplifier 322 and to positive and negative sources of voltage through resistors 320 and 321, respectively. Another input terminal on amplifier 322 is connected to ground through resistor 323 and to the output terminal through resistor 324. The output of amplifier 322 is connected to the $E_A$ terminal on binary counter 270. The right end of resistor 325 is connected to a positive source of potential through resistor 326 and to ground through capacitor 327.

The Q5 and Q1 outputs of binary counters 270 and 271, respectively, are connected to the input terminals of nand gate 328. One of the input terminals (6) of nand gate 328 is connected to the 5 and 9 terminals of flip-flops 335 and 287, respectively, and to the clock terminals 3 and 11 on flip-flops 113 and 148, respectively. The output terminal of nand gate 328 is connected to an input terminal on nand gate 349 through a capacitor 339, the other input of nand gate 349 is connected to the output of nand gate 293 through resistor 348 and to an input terminal on nand gate 294. Nand gate 293 has one input terminal connected to the top of resistor 296 and the other input terminal connected to the output of nand gate 294. The other input terminal of nand gate 294 is connected to the lower end of resistor 295 and the junction between resistors 295 and 296 is connected to a source of potential (not shown) as may be seen on the start-stop switch at the bottom of FIG. 6G of the drawing, one or the other end of resistors 296 and 295 may be connected to ground. The output of nand gate 349 is connected to the reset terminal on flip-flop 352 through resistor 350. The Q output terminal on flip-flip 352 is connected to input terminals 5 and 2 on nor gates 289 and 270 and to amplifier 353. The output of amplifier 353 is connected to the forward winding on motor 11 through resistor 356 having capacitor 355 and resistor 357 in parallel therewith through transistor 358 connected to a source of potential (not shown) to the winding. The output of amplifier 353 is also connected to the count terminal on flip-flop 357. Flip-flop 357 is shown with its reset terminal at the lower bottom connected through a resistor 172 to the output of an inverter 171 and to the output of nor gate 170. The Q terminal on flip-flop 357 is connected to the reverse motor winding 365 through amplifier 360, having its output connected to the $\overline{Q}$ terminal on flip-flop 357 and to transistor 364 through resistor 363 having capacitor 361 and 362 in parallel therewith and having an emitter terminal connected to a source of potential (not shown).

A pair of NAND gates 291 and 292 are shown having their output terminals interconnected to the respective input terminals and the other input terminals connected across resistors 297 and 298 which are connected to the start-stop switch at the bottom of FIG. 6G to be alternately connected to ground. The mid-points of resistors 297 and 298 are connected to a source of potential (not shown), the output of NAND gate 292 is connected to the count terminal on flip-flop 352 and the lower terminal on nor gate 170 and the output terminal on nand gate 291 is connected to the reset terminals on hex counters 277 and 278.

Figure 6C:
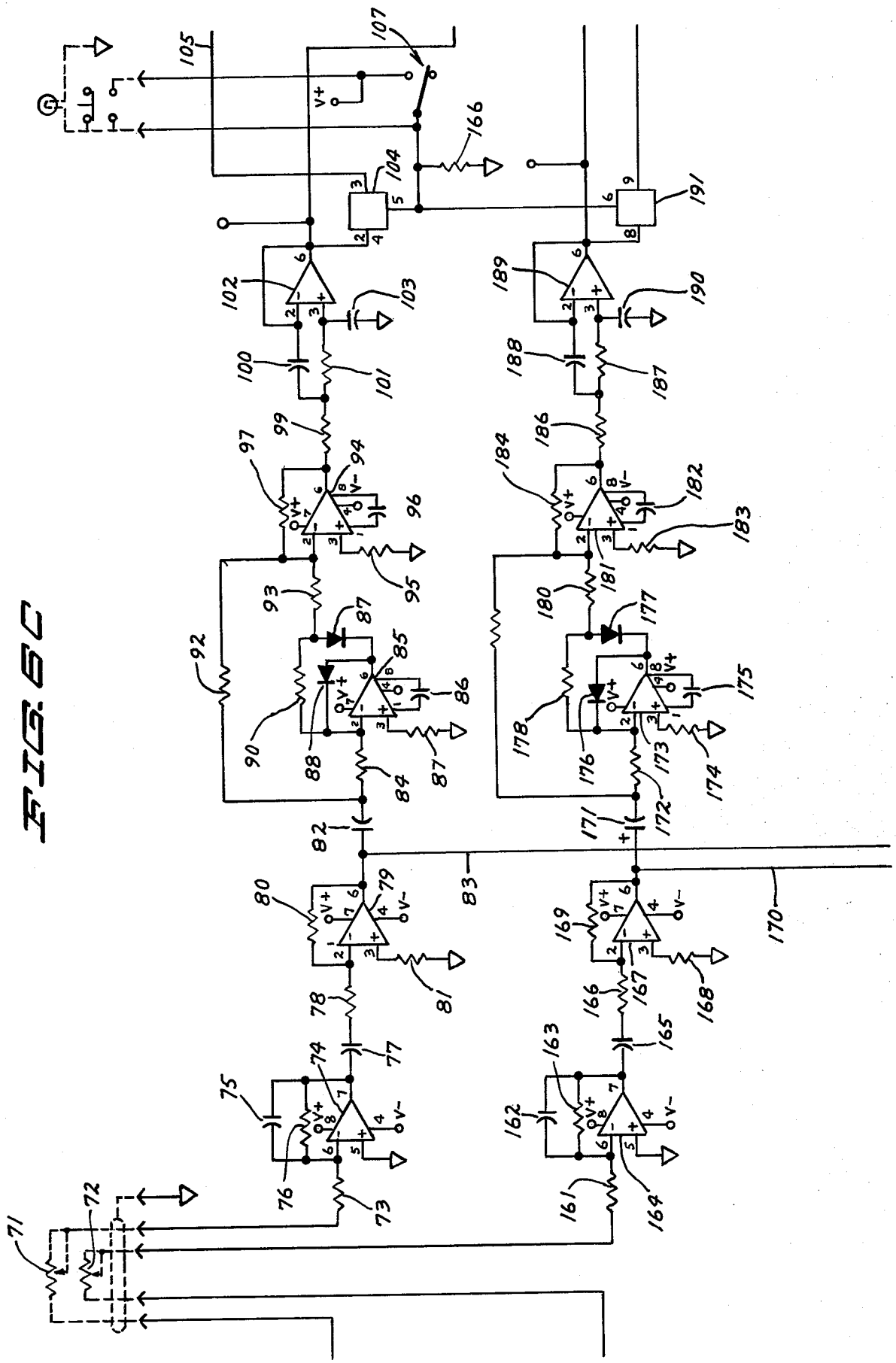
Figure 6D:
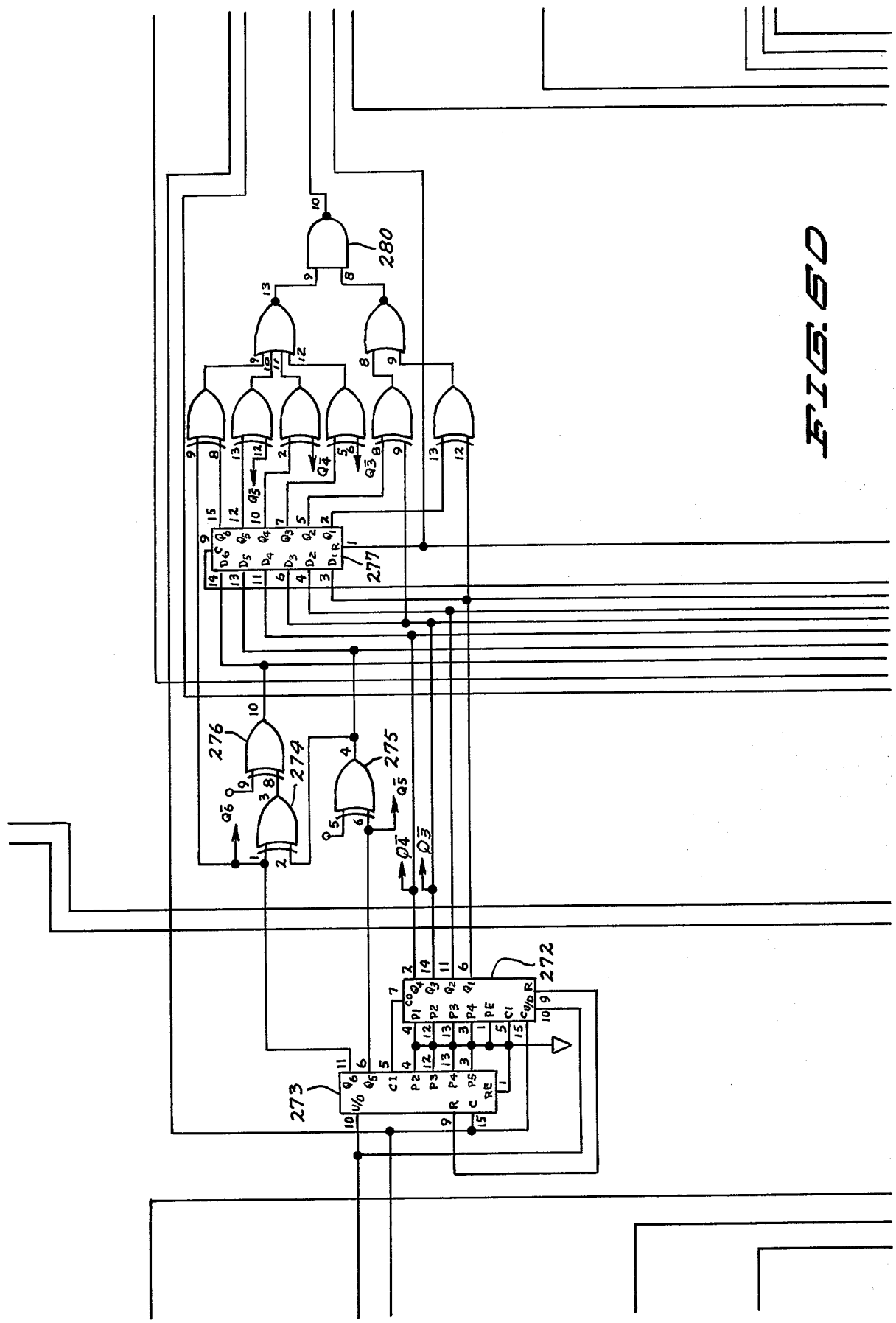
Figure 6E:
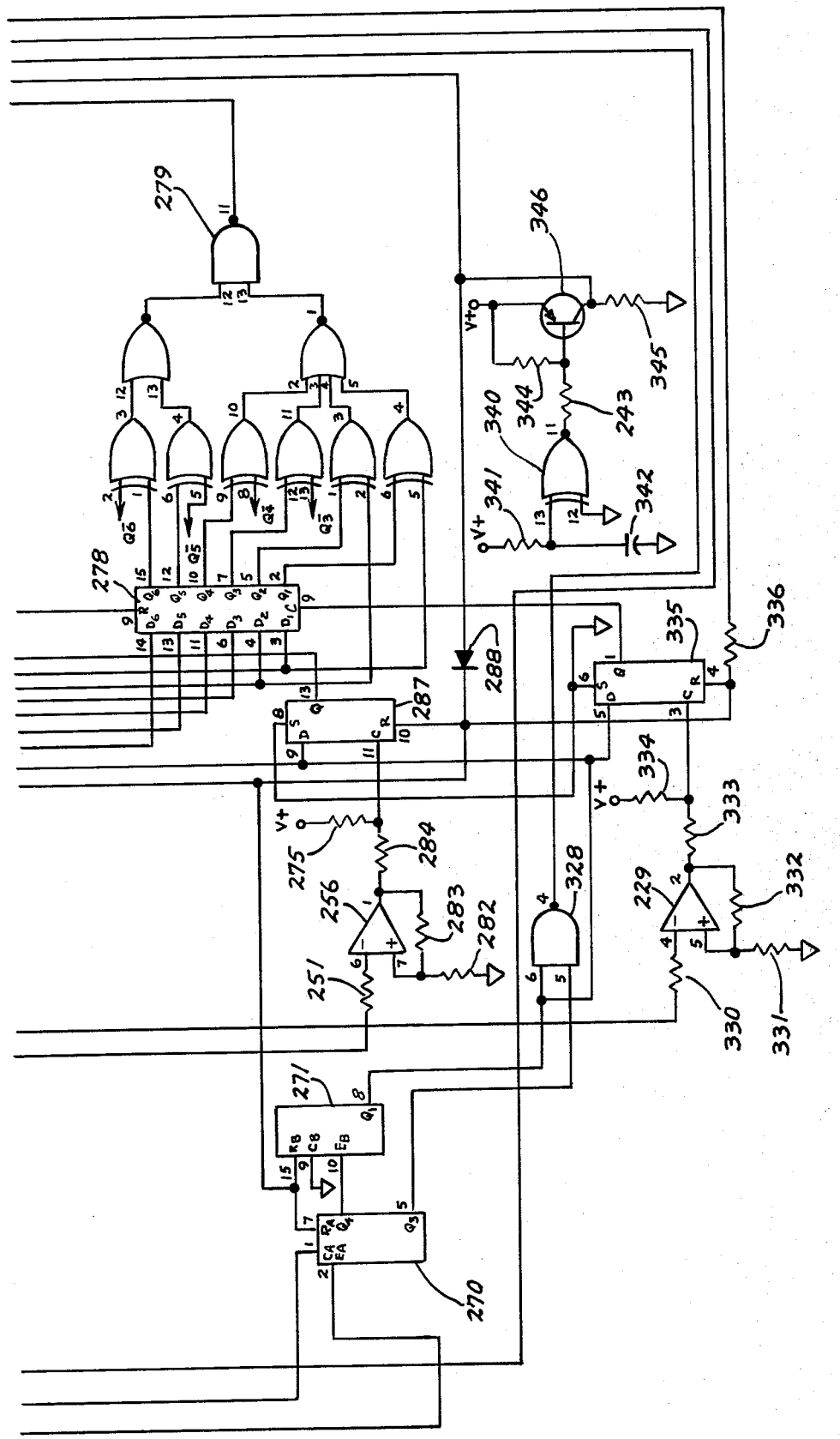

Referring to the bottom of FIG. 6E, an exclusive or gate 340 is shown having one input terminal connected to ground and the other input terminal connected to ground through capacitor 342 and to a source of potential (not shown) through resistor 341. The output of exclusive or gate 340 is connected to the base electrode of transistor 346 through resistor 243 and to the emitter and a source of positive potential (not shown) through resistor 344. The collector of transistor 346 is connected to ground through resistor 345 and, through diode 288, to the reset terminals on flip-flops 287 and 335, the reset terminals are A and b on binary counters 270 and 271 and to the reset terminals on binary counters 118, 203 and 204; and to the reset terminals on flip-flops 352 and 357 through diodes 351 and 173, respectively; and to the reset terminals on flip-flops 113 and 148 through diodes 115 and 146, respectively. The following is a table of values of components used in the fabrication of the illustrative embodiment:

| Reference Character | Value (Part No.) | Manufacturer |
|---|---|---|
| 48 | 130K resistor | |
| 49 | 20k resistor | |
| 50 | 100 ohm resistor | |
| 51 | .12 microfarad capacitor | |
| 52 | dual op amp MC1458CP-1 | Motorola |
| 53 | 18.2K ohm resistor | |
| 54 | 10K ohm resistor | |
| 55 | 130K ohm resistor | |
| 56 | .12 microfarad capacitor | |
| 57 | 20K ohm resistor | |
| 58 | Type MC1458CP-1 dual op amp | Motorola |
| 59 | 200K ohm resistor | |
| 60 | 1MEG. ohm potentiometer | |
| 62 | 30K ohm resistor | |
| 63 | Type MC1741CP-1 op amp | Motorola |
| 64 | 5.11K ohm resistor | |
| 65 | 61.9K ohm resistor | |
| 66 | .27 microfarad capacitor | |
| 67 | 124K ohm resistor | |
| 68 | Type MC1458CP-1 dual op amp | Motorola |
| 69 | 453K ohm resistor | |
| 70 | .018 capacitor | microfarad |
| 73 | 124K ohm resistor | |
| 74 | Type MC1458CP-1 dual op amp | Motorola |
| 75 | .018 microfarad capacitor | |
| 76 | 453K ohm resistor | |
| 77 | .27 microfarad capacitor | |
| 78 | 124K ohm resistor | |
| 79 | Type MC1741CP-1 op amp | Motorola |
| 80 | 124K ohm resistor | |
| 81 | 6.9K ohm resistor | |
| 82 | 15 microfarad capacitor | |
| 84 | 20K ohm resistor | |
| 85 | Type LM308N op amp | National |

-continued

| Reference Character | Value (Part No.) | Manufacturer |
|---|---|---|
| | | Semiconductor |
| 86 | 20 microfarad capacitor | |
| 87 | 10K ohm resistor | |
| 90 | 20K ohm resistor | |
| 92 | 20K ohm resistor | |
| 93 | 10K ohm resistor | |
| 94 | Type LM310N voltage follower | National Semiconductor |
| 95 | 6.81K ohm resistor | |
| 96 | 20 picofarad capacitor | |
| 97 | 22.1K ohm resistor | |
| 99 | 18.2K ohm resistor | |
| 100 | 6.8 microfarad capacitor | |
| 101 | 18.2K ohm resistor | |
| 102 | Type LM310N voltage follower | National Semiconductor |
| 103 | 3.3 microfarad capacitor | |
| 104 | Type CD4016AE analog switch | RCA |
| 106 | 4.7K capacitor | |
| 108 | Type LM339N quad comparator | National Semiconductor |
| 109 | 270K ohm resistor | |
| 110 | 100 ohm resistor | |
| 111 | 10K ohm resistor | |
| 112 | 10K ohm resistor | |
| 113 | Type CD4013AE flip-flop | RCA |
| 116 | Type CD4011AE nand gate | RCA |
| 117 | Type CD4068BE nand gate | RCA |
| 118 | Type CD4520BE binary counter | RCA |
| 119 | Type 316LO8104 resistor network | Alan Bradley |
| 120 | .001 micro-farad capacitor | |
| 121 | Type LM310N voltage follower | National Semiconductor |
| 123 | 6.04K ohm resistor | |
| 124 | 10K ohm resistor | |
| 125 | 1.1K ohm resistor | |
| 127 | 124K ohm resistor | |
| 128 | Type MC1458CP-1 dual op amp | Motorola |
| 129 | 10K ohm resistor | |
| 130 | 10K ohm resistor | |
| 131 | Type MC1458CP-1 dual op amp | Motorola |
| 132 | 100 picofarad capacitor | |
| 133 | 100K resistor | |
| 136 | 130K resistor | |
| 137 | 20K ohm resistor | |
| 138 | 100 ohm resistor | |
| 139 | .12 microfarad capacitor | |
| 140 | Type MC1458CP-1 dual op amp | Motorola |
| 141 | 18.2K ohm resistor | |
| 142 | 10K ohm resistor | |
| 143 | .12 microfarad capacitor | |
| 144 | 130K ohm resistor | |
| 145 | 20K ohm resistor | |
| 146 | 316K ohm resistor | |
| 147 | 1MEG. ohm potentiometer | |
| 148 | Type LM308N op amp | National Semiconductor |
| 149 | 124K ohm resistor | |
| 150 | Type MC1458CP-1 dual op amp | Motorola |
| 151 | 100K ohm resistor | |
| 152 | (see 150) | |
| 153 | 100K ohm resistor | |
| 154 | 124K ohm resistor | |
| 155 | 124K ohm resistor | |
| 156 | 61.9 ohm resistor | |
| 157 | 200K ohm resistor | |
| 158 | .27 microfarad capacitor | |
| 159 | 124K ohm resistor | |
| 160 | Type MC1458CP-1 dual op amp | Motorola |
| 161 | 124K ohm resistor | |
| 162 | .018 microfarad capacitor | |
| 163 | 453K ohm capacitor | |
| 164 | (see 160) | |
| 165 | .27 microfarad capacitor | |
| 166 | 124K ohm resistor | |
| 167 | Type MC1741CP-1 op amp | Motorola |
| 168 | 61.9K ohm resistor | |
| 169 | 124K ohm resistor | |
| 171 | 15 microfarad capacitor | |
| 172 | 20K ohm resistor | |
| 173 | Type LM308N op amp | National Semiconductor |
| 174 | 10K ohm resistor | |
| 175 | 20 picofarad capacitor | |
| 178 | 20K ohm resistor | |
| 180 | 10K ohm resistor | |
| 181 | Type LM308N op amp | National Semiconductor |
| 182 | 20 picofarad capacitor | |
| 183 | 6.81K ohm resistor | |
| 184 | 22.1K ohm resistor | |
| 186 | 18.2 ohm resistor | |
| 187 | 18.2 ohm resistor | |
| 188 | 6.8 microfarad capacitor | |
| 189 | Type LM310N voltage follower | National Semiconductor |
| 190 | 3.3 microfarad capacitor | |
| 191 | Type CD4016AE analog switch | RCA |
| 192 | Type LM3391 quad comparator | National Semiconductor |
| 193 | 270K ohm resistor | |
| 194 | 10K ohm resistor | |
| 195 | 100 ohm resistor | |
| 198 | Type CD4013AE flip-flop | RCA |
| 199 | 10K ohm resistor | |
| 200 | 48.7K ohm resistor | |
| 201 | Type CD4011AE nand gate | RCA |
| 202 | Type CD4068BE nand gate | RCA |
| 203 | Type CD4520BE binary counter | RCA |
| 204 | (see 203) | |
| 205 | Type 316L08104 resistor network | Alan Bradley |
| 206 | Type LM310N voltage follower | National Semiconductor |
| 207 | .001 microfarad capacitor | |
| 209 | 6.04K ohm resistor | |
| 210 | 10K ohm resistor | |
| 211 | Type MC1458CP-1; dual op amp | Motorola |
| 212 | 10K ohm resistor | |
| 213 | 10K ohm resistor | |
| 214 | Type MC1458CP-1 dual op amp | Motorola |
| 215 | 10K ohm resistor | |
| 216 | 1000 picofarad capacitor | |
| 217 | 150 ohm resistor | |
| 218 | 150K ohm resistor | |
| 219 | 9K ohm resistor | |
| 220 | Type LM339N quad comparator | National Semiconductor |
| 221 | 15K ohm resistor | |
| 222 | 270K ohm resistor | |
| 223 | 10K ohm resistor | |
| 224 | 10K ohm resistor | |
| 225 | Type CD4013AE flip-flop | RCA |
| 226 | (see 225) | |
| 227 | Type CD4023AE nand gate | RCA |
| 228 | (see 227) | |
| 229 | Type CD4011AE nand gate | RCA |
| 230 | (see 229) | |
| 231 | (see 216) | |
| 232 | (see 219) | |
| 233 | 91K ohm resistor | |
| 234 | 150K ohm resistor | |

-continued

| Reference Character | Value (Part No.) | Manufacturer |
|---|---|---|
| 235 | Type LM339N quad comparator | National Semiconductor |
| 236 | 15K ohm resistor | |
| 237 | 270K ohm resistor | |
| 238 | 10K ohm resistor | |
| 239 | 10K ohm resistor | |
| 240 | Type CD4011AE nand gate | RCA |
| 241 | Type MC14572CP multifunction I.C. | Motorola |
| 242 | 200K ohm resistor | |
| 243 | 20K ohm resistor | |
| 244 | (see 241) | |
| 245 | 680 picofarad capacitor | |
| 250 | Type CD4047AE astable multivibrator | RCA |
| 251 | .018 microfarad capacitor | |
| 252 | 18.2K ohm resistor | |
| 253 | 5K ohm resistor | |
| 254 | Type CD4046AE phase lock loop | RCA |
| 255 | 20K ohm resistor | |
| 256 | 220K ohm resistor | |
| 257 | 220K ohm resistor | |
| 258 | .1 microfarad capacitor | |
| 259 | .05 microfarad capacitor | |
| 260 | Type MC1741CP-1 op amp | Motorola |
| 261 | 10K ohm resistor | |
| 262 | 20K ohm resistor | |
| 263 | Type LM339AN quad comparator | National Semiconductor |
| 264 | 1K ohm resistor | |
| 265 | 270K ohm resistor | |
| 266 | 10K ohm resistor | |
| 270 | Type CD4520BE binary counter | RCA |
| 271 | (see 270) | |
| 272 | Type CD4516BE up-down counter | RCA |
| 273 | (see 272) | |
| 274 | Type CD4030AE exclusive or gate | RCA |
| 275 | (see 274) | |
| 276 | (see 274) | |
| 277 | Type MM74C174N hex latch | National Semiconductor |
| 278 | (see 277) | |
| 279 | Type CD4011AE nand gate | RCA |
| 280 | (see 279) | |
| 281 | 22 ohm resistor | |
| 282 | 200 ohm resistor | |
| 283 | 270K ohm resistor | |
| 284 | 10K ohm resistor | |
| 285 | 10K ohm resistor | |
| 286 | Type LM339AN quad comparator | National Semiconductor |
| 289 | Type CD4001AE Nor gate | RCA |
| 290 | (see 289) | |
| 291, 292, 293, 294 | Type CD4011AE nand gate | |
| 295, 296, 297, 298 | 4.7K ohm resistor | |
| 300 | 82K ohm resistor | |
| 302 | 2.2 microfarad capacitor | |
| 303 | 1K ohm resistor | |
| 304 | 10K ohm resistor | |
| 305 | Type 2N4403 transistor | |
| 306 | Type CD4049AE inverted buffer | RCA |
| 307 | 82K ohm resistor | |
| 309 | (see 306) | |
| 310 | 2.2 microfarad capacitor | |
| 311 | 1K ohm resistor | |
| 312 | Type 2N4403 transistor | |
| 313 | 10K ohm resistor | |
| 320 | 91K ohm resistor | |
| 321 | 150K ohm resistor | |
| 322 | Type LM339AN quad comparator | National Semiconductor |
| 323 | 15K ohm resistor | |

-continued

| Reference Character | Value (Part No.) | Manufacturer |
|---|---|---|
| 324 | 270K ohm resistor | |
| 325 | 10K ohm resistor | |
| 326 | 10K ohm resistor | |
| 327 | 100 picofarad capacitor | |
| 328 | Type CD4011AE nand gate | RCA |
| 329 | Type LM339AN quad comparator | National Semiconductor |
| 330 | 22 ohm resistor | |
| 331 | 200 ohm resistor | |
| 332 | 270K resistor | |
| 333 | 10K resistor | |
| 334 | 10K resistor | |
| 335 | Type CD4013AE flip-flop | RCA |
| 336 | 10K ohm resistor | |
| 339 | .1 microfarad capacitor | |
| 340 | Type CD4030AE exclusive or gate | RCA |
| 341 | 270K resistor | |
| 342 | 1 microfarad capacitor | |
| 343 | 4.7K ohm resistor | |
| 344 | 10K ohm resistor | |
| 345 | 10K ohm resistor | |
| 346 | 2N4403 transistor | |
| 347 | 100K ohm resistor | |
| 348 | 20K ohm resistor | |
| 349 | Type CD4011AE nand gate | RCA |
| 350 | 10K ohm resistor | |
| 352 | Type CD4013AE flip-flop | RCA |
| 353 | Type MC14572CP multifunction I.C. | Motorola |
| 354 | (see 352) | |
| 355 | .05 microfarad capacitor | |
| 356 | 1K ohm resistor | |
| 357 | 10K ohm resistor | |
| 358 | Type 2N4403 transistor | |
| 360 | (see 353) | |
| 361 | .05 microfarad capacitor | |
| 362 | 10K ohm resistor | |
| 363 | 1K ohm resistor | |
| 364 | Type 2N4403 transistor | |
| 370, 371 | (see 352) | |
| 372 | 10K ohm resistor | |
| 373 | 124K ohm resistor | |
| 374 | Type LM339N quad comparator | |
| 375 | 270K ohm resistor | |
| 376 | 10K ohm resistor | |
| 377 | 100 ohm resistor | |
| 378 | 100 ohm diode | |
| 379 | 100 ohm diode | |
| 380 | Type CD4013AE flip-flop | RCA |

OPERATION

In considering the operation of our invention, it is assumed that a wheel-tire system has been suitably mounted on axle 12 for rotation therewith with its inner and outer planes of rotation 22 and 21 disposed so that plane 22 is in the plane of rotation of the axle engaging and supporting portion at the right end of tubular projection 15 on bearing 14, as illustrated in FIG. 2. The rim width is determined and potentiometer 61, having previously been calibrated in units of rim width, is adjusted as well as rim diameter potentiometers 71 and 72, which likewise have been calibrated in terms of units of diameter for the wheel, are likewise adjusted so that the computations performed relative to the magnitudes of the forces of unbalance may be directly read on meters 34 and 35 in units of weight of material to be added at predetermined angular positions on the rim of the wheel-tire system.

It will be assumed that the start-stop switches are initially in the position shown and that the power supply (not shown) is energized. At this time, a pulse supplied to transistor 346 from exclusive or gate 340 (FIG. 6E) provides a reset pulse to reset terminals on motor drive flip-flops 352 and 357 (FIG. 6G), each providing an output which results in the continuing de-energization of motor forward and reverse windings 354 and 365. A further pulse is applied to the reset terminals of flip-flops 113 and 148 effectively disconnecting meters 34 and 35. The same output is connected to the reset terminals on binary counters 270 and 271 and to the reset terminals on binary counters 118 and 203-204. Oscillator 250 is energized and operative to oscillate at a frequency related to the desired velocity of revolution of shaft 12, as determined by the number of apertures 28 in disk 27, its output is connected to phase lock loop 254 which results in no output at switch 268. Further, the high frequency, in the magnitude of ten times the frequency of oscillator 250, oscillator is energized to continuously clock flip-flops 225 and 226 (FIG. 6B). Further, the output of flip-flop 352 on FI. 6G is of a polarity as to inhibit the operation of nor gates 289 and 290 so that no output therefrom will be applied to inner and outer indicators 37 and 36 (FIG. 6G). There are no signals applied to any of the input channels shown at the left end of FIG. 6A and 6B for the magnitude-force and phase and frequency sources of signal.

At this stage, the apparatus is in readiness for the determination of the amount of unbalance and the necessary action to be taken by the operator as far as adding weights at predetermined locations in the two planes of rotation of wheel-tire system 20-23; namely, at the rim of the wheel 20 at the angular positions to be determined.

The operator initiates the operation by momentarily reversing the contacts on the start-stop button shown at the lower left hand end of FIGS. 6G. This results in the application of a pulse to the C terminal of flip-flop 352 from nand gate 292 which in turn results in a Q output which, when conveyed through inverter 353 to transistor 358 results in the energization of motor forward drive winding 354. Simultaneously, an inhibit pulse is transmitted from the Q terminal of flip-flop 352 to NOR gates 289 and 290 for inhibiting the application of any output to inner and outer indicators 37 and 36. Simultaneously, an output from nand gate 291 to the reset terminals on hex counters 277 and 278 places them in condition for registering and storing information concerning the angular positions of shaft 12. At the same time, the reversal of the state of the multivibrator comprised of nand gates 293 and 294 in the lower left hand corner of FIG. 6G results in a removal of the reset signal from nand gate 349 to reset terminal 10 on flip-flop 352. The forward winding of motor 10 is thus energized and motor 10 is operative to initiate and accelerate the rotational speed of shaft 12. As the shaft rotates, force signals proportional to the velocity of displacement of shaft 12 in the horizontal plane 16 are generated by transducers 25 and 26, which are in turn applied to the windings 47 and 135 on the inner and outer channels (extendings from FIGS. 6A through FIG. 6C to FIG. 6F), which will result in an indication on meters 35 and 34, respectively, of the amount of weights will be needed to compensate for the unbalance in the wheel-tire system. Simultaneously, signals will be provided to phototransistors 31, 32 and 33, corresponding to the angular position and rotational velocity of shaft 12. At this time, flip-flops 113 and 148 and nor gates 289 and 290 inhibit the transmittal of signals corresponding to weight and angle to the operator indicators comprising meters 34, 35, and lights 37, 36. As motor 11 increases the rotational velocity of shaft 12 to a speed which corresponds to that determined by oscillator 250 (middle portion of FIG. 6B) phase lock loop 259 will become operative to transmit the oscillator signal as a clock to the timing circuit comprised of binary counters 270 and 271 which is enabled once a revolution by the velocity of rpm signal supplied from photoelectric transistor 33, such signal is also supplied to up-down counters 273 and 272, to reset the counters at the beginning of every revolution of operation of shaft 12. The initiation of the counting function of binary counters 270 and 271 (left end of drawings FIG. 6E) results in a signal applied to nand gate 328 from the Q terminal 11 on binary counter 271 and to the drive terminals of flip-flops 287 and 335 (middle portion, FIG. 6E) as well as to the C2 terminals on flip-flops 113 and 148 (middle left portion of FIG. 6F). During the time interval determined by the number of counts necessary to cause the Q3 and Q1 outputs on binary counters 270 and 271 to appear in time coincidence, binary counter 270 continues to receive an enabling signal once every revolution so that it may accept clock pulses from oscillator 250 to continue its counting operations and up-down counters 273 and 272 are reset at the beginning of every revolution by the signals determined from photoelectric transistor 33 in response to aperture 29 in disk 27. Simultaneously, flip-flops 225 and 226, and nand gates 227 and 228 and 231 and 232 will be operative to provide the counting pulse train to counters 273 and 272, the outputs of which are combined to form a code which is applied to the inputs of hex latches 277 and 278 to thereby control the respective output terminals indicated by Q1, Q6. The output of the hex latches which continuously step up and down in accordance with the signals provided from up-down counters 273 and 272, and which continue to change as shaft 15 rotates, are connected, in each case, to a plurality of logic elements shown in the form of exclusive or gates, nor gates, and each culminating in a hand gate 280 and 279, respectively, the output of which may be used to activate inner and outer indicators 37 and 36, respectively. It should be noted at this point that indicators 37 and 36 are each energized through a fast-on, slow-off network including resistor 300, diode 301, capacitor 302 and inverter 306, in the case of the "inner" channel.

Figure 6F:
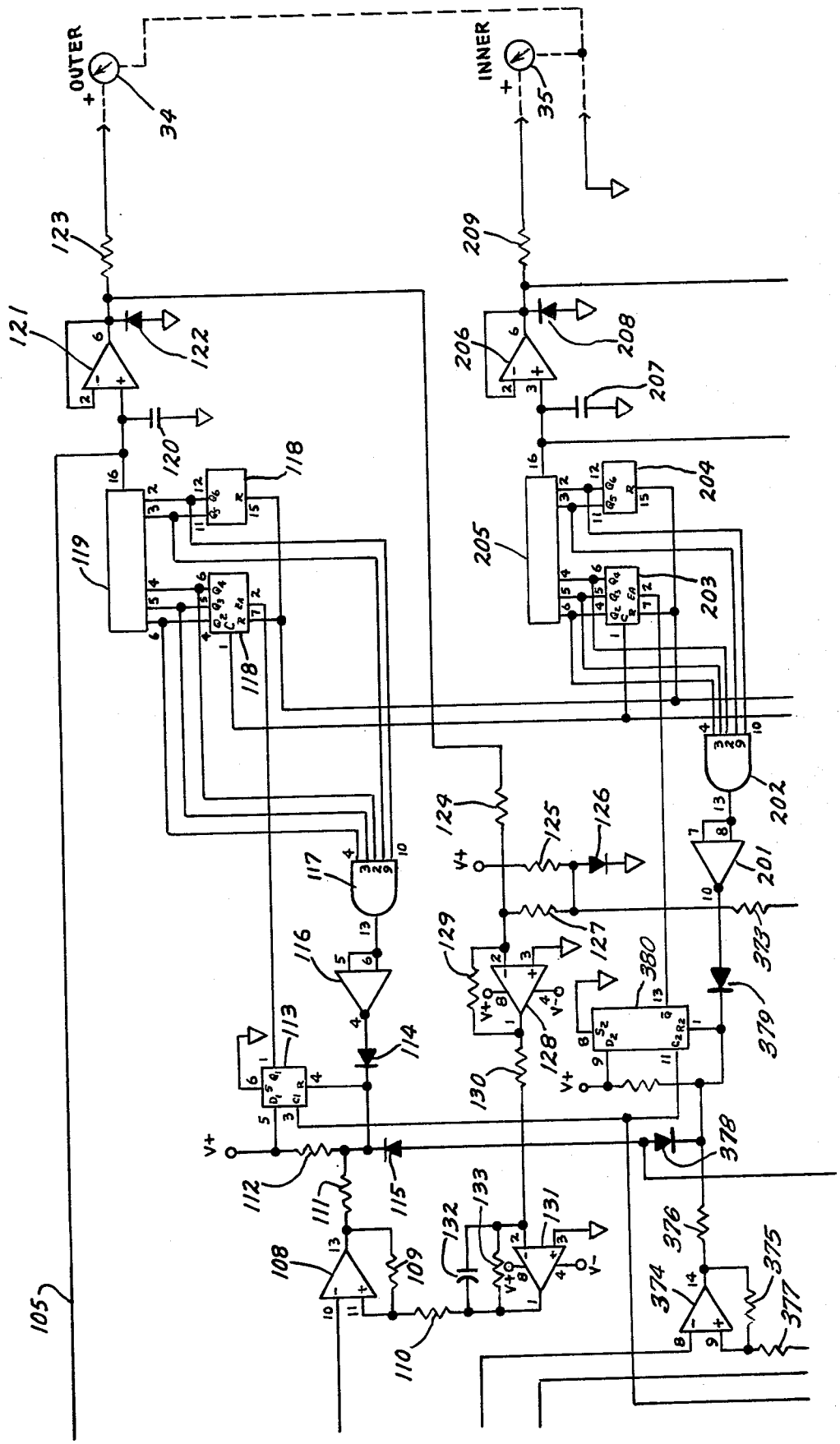
Figure 66:
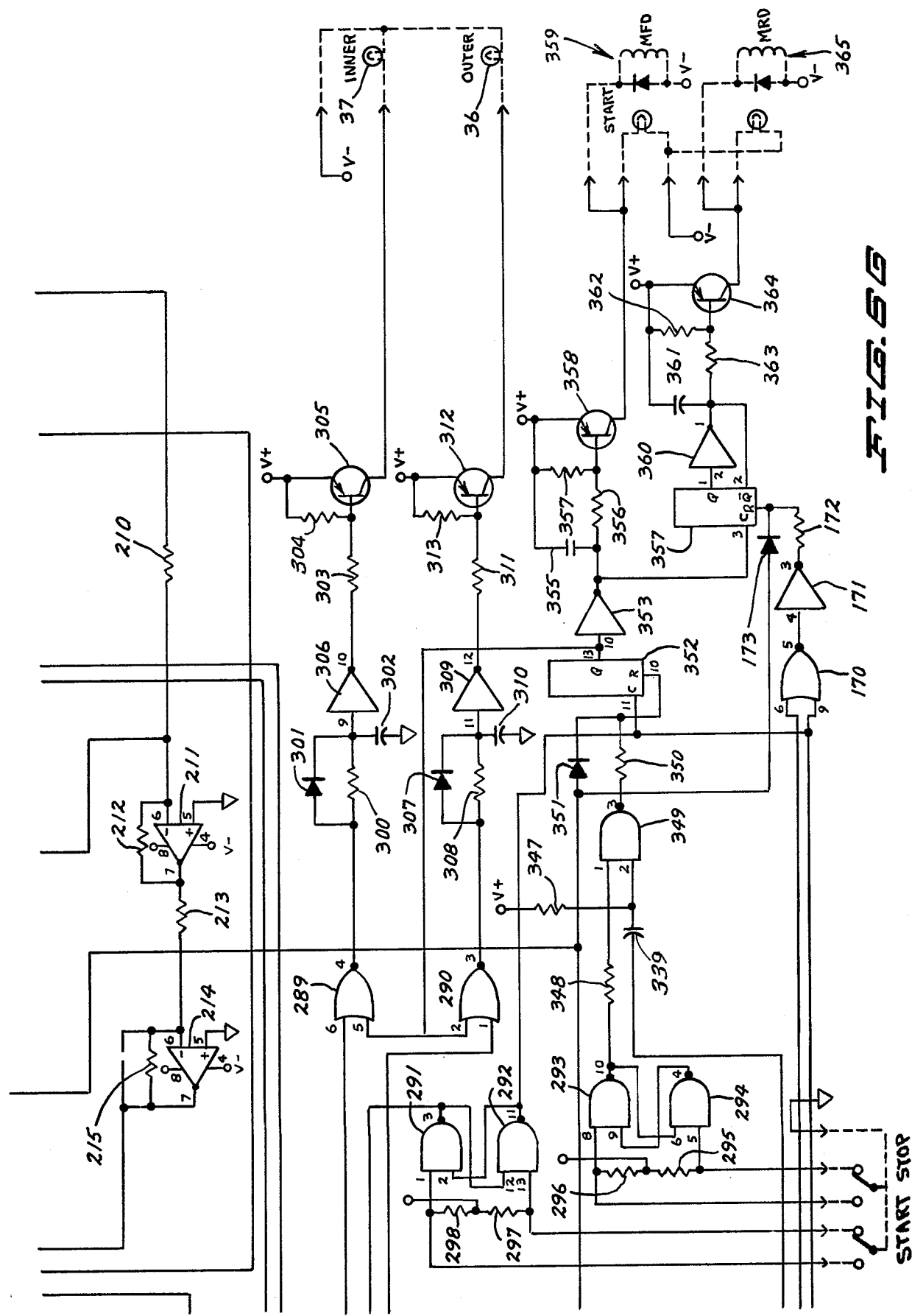

Further, during the same time interval, the signals applied to the outer and inner channels appearing at FIG. 6A, FIG. 6E, and FIG. 6F, first proceed, in the case of both channels, through a zero phase shift signal processing portion of the channels up to capacitors 92 and 171, respectively, at which point they are still in the form of alternating potentials which have a magnitude corresponding to the degree of velocity of unbalance for any given angular position of shaft 12 as an instantaneous signal. It may be noted that the inner channel's signal is modified by the introduction of selected portions of the outer channel signal through amplifier 152 and the interconnection between the output of amplifier 63 and amplifier 150.

After the signals have been thus processed, they are each demodulated and filtered to provide a dc level corresponding to the magnitude of the maximum unbalance of the wheel-tire system. These signals are compared in comparators 108 and 142, the output of which is applied to binary counters 118 and 203–204, respectively. The counters continue to operate according to the frequency of the clock signal applied from the output of nand gate 232 (corresponding to the angular outer and inner meters 34 and 35 will reflect the average level of the force unbalance signals as determined by the displacement of bearings 13 and 14 from their normal positions).

It should be noted that the operation of hex latches 277 and 278 and the associated logic connected to their respective outputs and the logic associated with the outputs of up-down counters 273 and 272 is such that by using the connections indicated (only some of which are shown as complete conductors) a 90° phase shift is computed into the operation of the counters for the logic associated with the hex latches so that when a real time positional signal is present in the hex latches, the logic consisting of the exclusive or and nor gates connected between hex latches 277 and 278 and nand gates 280 and 279, respectively, will respond to a particular count with a 90° shift. This is occasioned by the operations performed in the integration of the velocity of displacement signal supplied to the two channels of FIG. 6A, 6C and 6F. The hex latches will operate continuously to store the signals applied to them until the first zero crossing of the signals appearing at amplifiers 79 and 167 at which time flip-flops 287 and 335 are toggled by zero crossing detectors 256 and 229 to "latch" hex latches 277 or 278 to store the signal appearing therein at that instant. This signal will be available for the illumination of indicators 37 or 36 in subsequent phases of operation of the machine.

When coincidence is reached for the outputs of binary counters 270 and 272 for the indicated terminals Q3 and Q1, respectively, nand gate 328 transmits a signal to nand gate 349 which resets flip-flop 352 to de-energize motor forward winding 354, removes the inhibit signal from nor gates 289 and 290 and supplies a pulse to toggle flip-flop 357 to energize motor reverse winding 365. At this point in the cycle of operation, flip-flops 113 and 148 have been toggled by the operation of comparators 108 and 142 in driving binary counters 118 and 203–204 to a condition which supplies an output voltage through digital to analog converters 119 and 205 so that the energization of meters 34 and 35, calibrated in convenient units, will indicate the correct total of weight to be supplied to the inner and outer planes of rotation of the wheel-tire system.

The energization of reverse winding 365 serves to provide a rapid braking of motor 11 and when a signal that is derived from the positional information derived from apertures 28 on disk 27, appears at the output of nand gate 229 and to nor gate 170 to the reset terminal on flip-flop 357 to thereby de-energize motor reverse winding 365 and the system is at rest.

At this time, the operator will rotate the wheel-tire system on shaft 12 until one or the other of the indicator lamps 36 or 37 is energized to indicate to the operator that he should apply a specific weight of material, such as lead balance weights, to the rim of the wheel-tire system in the indicated plane, inner plane 22 or outer plane 21. For convenience, the indicator lamp may be operative when the portion of the rim corresponding to the angular position for application of the weight is disposed vertically above the axis of rotation of shaft 12 and may take the form of a pointer or other convenient indicia that may be stationarily mounted on the base upon which the bearings and motor for the system are disposed.

When it is desired to perform another balancing act, another wheel-tire system is again disposed on the end of shaft 12 and the momentary contact start-stop switch is moved to its active position so that the movable contacts are disposed in the opposite relationship with their indicated contacts on the lower left portion of FIG. 6G to again toggle the multivibrators comprised of nand gates 291 and 292 and 293 and 294. This supplies a reset signal from terminal three on nand gate 291 to the reset terminals on hex latches 277 and 278, toggles flip-flop 352 to thereby energize motor forward winding 354 and provides the inhibit signal applied to terminals 2 and 5 on nor gates 290 and 289. The same signal is also applied to the reset terminals on flip-flops 287 and 335 through resistor 336 (FIG. 6E), to reset terminals 7 and 15 on binary counters 270 and 271 and to the reset terminals on binary counters 118 and 203-204 and the previously described operation ensues. The motor rapidly brings the wheel and tire system up to the predetermined speed and maintains the speed for sufficient time to enable the measurement functions to be completed (this need only be a few revolutions in actual practice), and then brings the motor to a rapid stop to allow the operator to complete the balancing operation by the application of weights at the appropriate locations in the amount indicated.

One of the features of our invention is concerned with the provision of a means for measuring angular position and direction of rotation with the utilization of a plurality of apertures spaced at angular positions chosen to provide the revolution necessary for effecting a satisfactory balancing of the wheel-tire system. In one embodiment, 64 apertures 28 were disposed on a common radius around the periphery of disk 27. A pair of sources of radiation 30, which may take the form of light emitting diodes, were disposed at the same angular spacing and a pair of photoelectric transistors 31 and 32 were disposed with the center axis of transistor 31 and the center axis of transistor 32 angularly spaced a distance somewhat less than the center axes of the equally spaced apertures 28. This, though the logic associated with transistors 31 and 32, provides an output from nand gate 229 whenever the disk is running in a reverse direction and an output from nand gate 232 whenever the disk is running in a forward direction, the total number of pulses being equal to the total number of apertures for the angular revolution required. In the present system, the clock in the forward direction provided for up-down counters 273 and 272 and for binary counters 118 and 203-204 consists of 64 pulses per revolution at a constant frequency when the motor is driving shaft 11 at the desired speed.

The test functions associated with switch 169 on the lower right hand corner of FIG. 6B and the switch and functions associated with analogue switch 104 and 191 at the top of FIG. 6C are not essential to the operation of our invention and therefore the description and operation of same are not included.

We claim:
1. Electronic wheel balancing apparatus comprising in combination:
   (a) a shaft for rotatably mounting a wheel and tire;
   (b) reversible motor means driveably connected to said shaft;

(c) control means for energizing said motor from a source of energy;

(d) first and second bearing means rotatably journaling said shaft, said bearing means having mounting means permitting motion thereof in parallel planes, (e) first and second sources of signal connected to said first and second bearing means, said first and second sources of signal being indicative of the velocity of motion of the respective bearing means;

(f) third and fourth sources of signal, said third source of signal being indicative of the angular position of said shaft and the direction of rotation of said shaft, and said fourth source of signal being indicative of the rotational velocity of said shaft;

(g) signal responsive means connected to said first and second signals to indicate the magnitude of an imbalance in each of said planes and connected to said third signal to indicate the angular location of an imbalance in each of said planes;

(h) means connecting said sources of signal to said control means whereby said motor means is energized to attain a predetermined rotational velocity, the first and second signals are displayed on said signal responsive means to indicate the magnitude of imbalance in each of said planes, the third signal is displayed on said signal responsive means for indicating the angular location of the imbalance in each of said planes;

(i) means to energize said motor means in a reverse direction to thereby tend to stop said shaft; and, (j) means to de-energize said motor when the positional source of signal reverses direction allowing said shaft to remain at rest.

2. Electronic wheel balancing apparatus of claim 1 further comprising means to inhibit said signal responsive means from accepting the first, second, third and fourth signals until said shaft attains said predetermined rotational velocity.

3. Electronic wheel balancing apparatus of claim 1 wherein said signal responsive means for each plane comprises a digital means indicating the magnitude of weight to be added to said tire and wheel and indicating the angular position of said tire and wheel for adding the weight.

4. Electronic wheel balancing apparatus of claim 1 wherein said signal responsive means for each plane comprises an indicating meter and an indicating lamp whereby said meter indicates the magnitude of weight to be added to said tire and wheel and said lamp indicates the correct angular position for adding the weight.

5. Electronic wheel balancing apparatus of claim 1 wherein said signal responsive means comprises an indicating meter and an indicating lamp for an inner plane and outer plane of said tire and wheel whereby said meter indicates the magnitude of weight to be added and said lamp indicates the correct angular position for adding the weight to the inner and outer plane of said tire.

6. Electronic wheel balancing apparatus of claim 1 wherein said signal responsive means to indicate the magnitude of weight to each plane of said tire and wheel further comprises a meter for each plane, a digital to analog converter connected to said meter, a binary counter to supply a voltage to said digital to analog converter, a flip-flop to drive said binary counter, a comparator to drive said flip-flop, and means to process said first and second signals whereby said first and second sources of signal are processed prior to being compared for each plane.

7. Electronic wheel balancing apparatus of claim 6 further comprising amplifier means and demodulating means for each source of signal connected between said source of signal and said comparator whereby said sources of signal are amplified and demodulated to provide a filtered direct current level corresponding to the magnitude of imbalance of the tire and wheel to said comparator.

8. Electronic wheel balancing apparatus of claim 1 wherein said first and second sources of signal comprise a first and second velocity detecting transducer whereby said transducers convert displacement motion in said plane of said first and second bearings into electrical signals proportional to said velocity of motion.

9. Electronic wheel balancing apparatus of claim 1 wherein said third source of signal comprises a disk, a plurality of equally spaced apart apertures disposed on said disk, and means to generate said third source of signal.

10. Electronic wheel balancing apparatus of claim 9 wherein said plurality of equally spaced apart apertures comprises 64 apertures.

11. Electronic wheel balancing apparatus of claim 9 wherein said third source signal generating means comprises two light sources on one side of said disk and two light receivers on the other side of said disk.

12. Electronic wheel balancing apparatus of claim 1 wherein said reverse motor energization means further comprises means to de-energize a motor forward winding and means to energize a motor reverse winding to dynamically brake said motor.

13. Electronic wheel balancing apparatus of claim 12 wherein said means to energize said reverse motor reverse winding and means to de-energize said motor comprises a flip-flop.

14. Electronic wheel balancing apparatus of claim 1 wherein said signal responsive means to indicate the angular position of the weight to be added to the inner and outer planes of said tire and wheel further comprises an indicator for each plane, a current responsive switch connected to said indicator, a fast-slow network connected to said switch, a first logic means connected to said network, a hex latch connected to said first logic means, a up-down counter connected to said hex latch, second logic means connected to said hex latch, a flip-flop connected to said second logic means, and means connecting said third source of signal to said flip-flops to indicate the angular position for said weights.

15. Electronic wheel balancing apparatus of claim 14 further comprising an oscillator, a phase locked loop transmitting a signal from said oscillator to binary counters and also to said up-down counter for each plane, said flip-flops being driven by said binary counters whereby said binary counter continues to receive said fourth signal once every revolution whereupon said binary and up-down counters are reset at the beginning of every revolution from said fourth signal.

16. Electronic wheel balancing apparatus of claim 1 wherein said fourth source of signal comprises a disk, a single aperture disposed on said disk, and means to generate said fourth source of signal.

17. Electronic wheel balancing apparatus of claim 16 wherein said fourth source signal generating means comprises a light source on one side of said disk and a light receiver on the other side of said disk.

18. Electronic wheel balancing apparatus of claim 1 wherein said third and fourth sources of signal comprise a disk, a plurality of equally spaced apertures disposed on a common radius of said disk, a single aperture disposed on a different radius, means to generate said third source of signal from said plurality of apertures, and means to generate said fourth source of signal from said single aperture.

19. Electronic wheel balancing apparatus of claim 18 wherein said plurality of equally spaced apart apertures comprises 64 apertures.

20. Electronic wheel balancing apparatus of claim 18 wherein said third source of signal generating means comprises two light sources on one side of said disk and two light receivers on the other side of said disk and said fourth source of signal generating means comprises a light source on one side of said disk and a light receiver on the other side of said disk.

21. Electronic wheel balancing apparatus comprising in combination;
   (a) a shaft for rotatably mounting a wheel and tire;
   (b) means to energize and driveably rotatate a motor connected to said shaft in a forward direction;
   (c) first and second bearing means for rotatably journaling said shaft, mounting means permitting motion in one plane of each of said bearing means where said plane is parallel to the axis of rotation of said shaft, transducer means to generate a first and second signal indicative of the velocity of motion of the respective bearing means parallel to an inner and outer plane of said tire and wheel, means to process each of said signals comprising first amplifier means, means to adjust for rim width and rim diameter of said wheel demodulator means, second amplifier means, comparator means, flip-flop means, binary means, resistor network means, third amplifier means, and a display means all of which are serially connected and further including a fourth amplifier and resistive network means interconnecting said first amplifier means of each channel to indicate the magnitude of the imbalance on the inner and outer plane of said wheel and tire when said shaft reaches a predetermined rotational velocity;
   (d) a disk having a plurality of equally spaced apertures on a common radius, a first and second pulse generating means generating a third signal indicative of the angular position and direction of rotation of said shaft spaced apart on said common radius comprising said first pulse generating means serially connected to a fifth amplifier means and first logic means and comprising said second pulse generating means serially connected to a sixth amplifier means, an inverter, a first flip-flop means which is clocked by an oscillator and a phase locked loop driven by an oscillator, a second logic means, counter means and binary means, first hex latch means, a third logic means and two second latch means, two second flip-flop means controlling said two hex latches and receiving signals from said second amplifier means for each of said first and second signals, a fourth and fifth logic means for each of said second hex latch means, a sixth and seventh logic means connected to said fourth and fifth logic means, a seventh amplifier means connected to each of said fourth and fifth logic means, a switching means connected to each of said seventh amplifier means, and an indicating means connected to each amplifier means to indicate the angular position of imbalance on the inner and outer plane of said wheel and tire when said shaft reaches a predetermined rotational velocity;
   (e) said disk also having a single aperture on a different radius, a third pulse generating means generating a fourth signal indicative of the rotation velocity of said shaft comprising said third pulse generating means serially connected to an eighth amplifier means, said eighth amplifier connected to said binary means, a sixth logic means, a seventh logic means connected to said sixth logic means, a flip-flop and amplifier means connected to a motor means whereby said motor is dynamically energized in a reverse direction when said predetermined rotational velocity is reached and de-energized when a predetermined angular displacement in a reverse direction is detected.

22. A method for electronically balancing a tire mounted on a wheel, the steps comprising:
   (a) mounting a tire and wheel on a rotatable shaft journaled in two bearings;
   (b) rotating the shaft in a forward direction to a predetermined rotational velocity;
   (c) deriving a first and second signal of the velocity of motion in said two bearings corresponding to an inner and outer plane of said tire and wheel;
   (d) deriving a third and fourth signal of a directional angular position of said shaft and a rotational velocity of said shaft;
   (e) computing the magnitude of imbalance for said inner and outer planes of said tire and wheel from said first and second signals and said angular position from said third signal when said shaft reaches said predetermined rotational velocity;
   (f) displaying said magnitude of the imbalance and the angular position for said inner and outer planes of said tire and wheel; and
   (g) dynamically braking said rotating shaft in a reverse direction until said shaft has reversed its direction of rotation for a predetermined angular displacement.

23. A method for electronically balancing a tire and wheel of claim 22 further comprising the steps of
   (a) amplifying and demodulating said first and second signals derived from output windings of planar motion velocity detectors;
   (b) comparing the outputs of said signals;
   (c) averaging said comparator output to provide a digital output indication of the magnitude of the imbalance for each plane of said tire and wheel.

24. A method for electronically balancing a tire and wheel of claim 23 further comprising the step of
   (a) converting the digital output to an analog output for indicating the magnitude of the imbalance for each plane of said tire and wheel.

25. A method for electronically balancing a tire of claim 22 further comprising the steps of
   (a) generating light pulses as a function of the angular position of said shaft for said third signal;
   (b) generating a light pulse as a function of the rotational velocity of said shaft for said fourth signal;
   (c) processing said pulses of said third signal to provide indication of the angular position of said shaft for the imbalances of said inner and said outer plane of said tire and wheel; and (d) processing said pulse of said fourth signal to provide indication of the rotational velocity of said shaft.

26. A method for electronically balancing a tire and wheel of claim 22 further comprising the step of
   (a) processing said pulses from said third signal to control said dynamic braking of said shaft and the reverse rotation of said shaft over a predetermined angular displacement.

27. A method for electronically balancing a tire and wheel of claim 22 further comprising the step of
   (a) inhibiting said displaying until said predetermined rotational velocity is reached.

28. A method for electronically balancing a tire and wheel of claim 22 further comprising the step of
   (a) displaying the imbalance magnitude and angular position in analog form.

29. A method for electronically balancing a tire and wheel of claim 22 further comprising the step of
   (a) displaying the imbalance magnitude and angular position in digital form.

30. Electronic wheel balancing apparatus comprising:
   (a) a shaft for rotatably mounting a wheel and tire;
   (b) control means to energize said motor from a source of energy and driveably rotate said shaft in a forward direction;
   (c) first and second bearing means for rotatably journaling said shaft, mounting means permitting motion of each of said bearing means in parallel planes, each of said planes parallel to an inner and outer plane of said wheel and tire;
   (d) first and second signal source means connected to said first and second bearing means, said first and second signals indicative of the velocity of motion of said first and second bearing means;
   (e) third signal source means indicative of the angular position of said shaft and direction of rotation thereof;
   (f) fourth signal source means indicative of the rotational velocity of said shaft;
   (g) signal responsive means connected to said first and second signals to indicate on a display means the magnitude of imbalance on the inner and the outer plane of said wheel and tire when said shaft reaches a predetermined rotational velocity and connected to said third signal to indicate on a display means the angular location of imbalance on the inner and outer plane of said wheel and tire when said shaft reaches said predetermined rotational velocity; and
   (h) means connected to said fourth signal to energize said motor dynamically in a reverse direction when said predetermined rotational velocity is reached and deenergize said motor when said signal responsive means connected to said third signal indicates angular rotation in a reverse direction.

* * * * *

UNITED STATES PATENT AND TRADEMARK OFFICE
CERTIFICATE OF CORRECTION

PATENT NO. : 4,085,619
DATED : April 25, 1978
INVENTOR(S) : Haskell Shapiro and Robert E. DeCaro It is certified that error appears in the above-identified patent and that said Letters Patent are hereby corrected as shown below:

Claim 21, Column 22, line 7, delete "rotation" and insert therefor, --rotational--.

Signed and Sealed this

Tenth Day of October 1978

[SEAL]

Attest:

RUTH C. MASON
Attesting Officer

DONALD W. BANNER
Commissioner of Patents and Trademarks